(12) United States Patent
Lin

(10) Patent No.: US 10,771,297 B2
(45) Date of Patent: Sep. 8, 2020

(54) METHOD AND DEVICE FOR MULTI-SERVICE TRANSMISSION WITH FC-OFDM MODULATION AND CORRESPONDING RECEIVER

(71) Applicant: Orange, Paris (FR)

(72) Inventor: Hao Lin, Cesson Sevigne (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/084,090

(22) PCT Filed: Mar. 13, 2017

(86) PCT No.: PCT/FR2017/050560
§ 371 (c)(1),
(2) Date: Sep. 11, 2018

(87) PCT Pub. No.: WO2017/153699
PCT Pub. Date: Sep. 14, 2017

(65) Prior Publication Data
US 2019/0068419 A1   Feb. 28, 2019

(30) Foreign Application Priority Data

Mar. 11, 2016   (FR) ..................................... 16 52050
Apr. 15, 2016   (FR) ..................................... 16 53372

(51) Int. Cl.
*H04L 27/26* (2006.01)
*H04L 25/03* (2006.01)

(52) U.S. Cl.
CPC .... *H04L 27/2607* (2013.01); *H04L 25/03828* (2013.01); *H04L 27/26* (2013.01); *H04L 27/265* (2013.01); *H04L 27/2636* (2013.01)

(58) Field of Classification Search
CPC . H04L 27/2607; H04L 27/26; H04L 27/2636; H04L 27/265; H04L 25/03828
See application file for complete search history.

(56) References Cited

U.S. PATENT DOCUMENTS 6,031,390 A  *  2/2000  Fant ....................... G06F 7/502
                                              326/136
6,834,043 B1 * 12/2004  Vook .................... H04B 7/0669
                                              370/203
(Continued)

FOREIGN PATENT DOCUMENTS

EP       2890190 A1    7/2015
WO   2014072991 A1    5/2014
WO   2014123926 A1    8/2014

OTHER PUBLICATIONS

International Search Report dated May 9, 2017 for corresponding International Application No. PCT/FR2017/050560, filed Mar. 13, 2017.

(Continued)

*Primary Examiner* — James M Perez
(74) *Attorney, Agent, or Firm* — David D. Brush; Westman, Champlin & Koehler, P.A.

(57) ABSTRACT

A method implementing the same frequency-time transform of size M irrespective of the service. The method adds, during a frame setup, a cyclic extension of $L=L_1+L_2$ samples in order to obtain a sequence of M+L samples. The method carries out a time-domain filtering according to a function $f(n)$ of the samples n of the sequence of M+L samples.

10 Claims, 6 Drawing Sheets

(56) References Cited

U.S. PATENT DOCUMENTS

| | | | | |
|---|---|---|---|---|
| 6,950,387 B2* | 9/2005 | Shor | H04L 5/06 | 370/206 |
| 7,113,549 B1* | 9/2006 | Isaksson | H04L 5/143 | 375/222 |
| 7,366,090 B2* | 4/2008 | Suh | H04L 27/2613 | 370/208 |
| 7,539,259 B2* | 5/2009 | Dias | H04B 7/04 | 375/260 |
| 7,751,509 B1* | 7/2010 | Lehnert | H04B 1/7105 | 375/260 |
| 7,809,055 B2* | 10/2010 | Shtin | H04L 27/2647 | 375/232 |
| 7,948,868 B2* | 5/2011 | Sahlman | H04L 5/0007 | 370/210 |
| 7,952,987 B2* | 5/2011 | Chang | H04L 27/2607 | 370/203 |
| 7,991,091 B2* | 8/2011 | Suzuki | H04L 27/2605 | 370/203 |
| 8,045,635 B2* | 10/2011 | Ko | H04L 27/2602 | 341/94 |
| 8,064,554 B2* | 11/2011 | Suzuki | H04L 27/2605 | 370/348 |
| 8,090,050 B2* | 1/2012 | Suzuki | H04L 27/2605 | 370/210 |
| 8,179,829 B2* | 5/2012 | Bui | H04L 5/0007 | 370/312 |
| 8,249,129 B2* | 8/2012 | Fudge | H04B 1/7136 | 341/152 |
| 8,443,013 B1* | 5/2013 | Lin | G06Q 10/04 | 707/810 |
| 8,446,990 B2* | 5/2013 | Liu | H04L 25/0212 | 375/259 |
| 8,498,350 B2* | 7/2013 | Stern | H04L 27/2613 | 370/203 |
| 8,694,540 B1* | 4/2014 | Lin | G06F 16/211 | 707/777 |
| 8,794,063 B2* | 8/2014 | Miskell | G01F 23/284 | 73/290 V |
| 8,873,655 B2* | 10/2014 | Rao | H04L 5/00 | 375/260 |
| 8,891,662 B2* | 11/2014 | Jeong | H04L 5/0051 | 375/232 |
| 9,020,861 B2* | 4/2015 | Lin | G06F 40/18 | 706/11 |
| 9,313,063 B1* | 4/2016 | Jia | H04L 25/03006 | |
| 9,544,171 B2* | 1/2017 | Berardinelli | H04L 25/03343 | |
| 9,674,024 B2* | 6/2017 | Lin | H04L 27/2613 | |
| 9,705,726 B2* | 7/2017 | Dandach | H04L 27/2631 | |
| 9,780,891 B2* | 10/2017 | Eo | H04B 17/14 | |
| 9,781,536 B2* | 10/2017 | Chang | H04B 11/00 | |
| 9,847,802 B1* | 12/2017 | Farley | H04B 1/16 | |
| 9,906,285 B2* | 2/2018 | Ling | H04B 7/0617 | |
| 9,942,011 B2* | 4/2018 | Tang | H04L 25/03834 | |
| 10,432,442 B2* | 10/2019 | Lin | H04L 27/2634 | |
| 2003/0002471 A1* | 1/2003 | Crawford | H04B 17/336 | 370/343 |
| 2003/0165131 A1* | 9/2003 | Liang | H04L 25/03159 | 370/342 |
| 2004/0013084 A1* | 1/2004 | Thomas | H04L 25/03006 | 370/210 |
| 2004/0066802 A1* | 4/2004 | Ro | H04L 27/2607 | 370/528 |
| 2004/0081131 A1* | 4/2004 | Walton | H04L 5/0037 | 370/344 |
| 2004/0091057 A1* | 5/2004 | Yoshida | H04L 27/2613 | 375/260 |
| 2004/0208253 A1* | 10/2004 | Joo | H04L 27/2613 | 375/260 |
| 2004/0213365 A1* | 10/2004 | Murakami | H04L 27/2602 | 375/347 |
| 2004/0228283 A1* | 11/2004 | Naguib | H04L 5/006 | 370/252 |
| 2006/0087961 A1* | 4/2006 | Chang | H04L 27/2607 | 370/203 |
| 2006/0133467 A1* | 6/2006 | Clausen | H04L 27/2607 | 375/219 |
| 2006/0172704 A1* | 8/2006 | Nishio | H04L 5/0094 | 455/67.11 |
| 2007/0058738 A1* | 3/2007 | Mahadevappa | H04B 1/715 | 375/260 |
| 2007/0097851 A1* | 5/2007 | Adachi | H04L 27/2607 | 370/206 |
| 2007/0183520 A1* | 8/2007 | Kim | H04L 1/0001 | 375/260 |
| 2007/0189404 A1* | 8/2007 | Baum | H04L 25/0228 | 375/260 |
| 2007/0211765 A1* | 9/2007 | Vrcelj | H04L 27/2662 | 370/503 |
| 2007/0253496 A1* | 11/2007 | Giannakis | H04L 1/04 | 375/260 |
| 2008/0037685 A1* | 2/2008 | Giannakis | H04L 1/0618 | 375/299 |
| 2008/0043857 A1* | 2/2008 | Ribeiro Dias | H04L 27/2605 | 375/260 |
| 2008/0056116 A1* | 3/2008 | Ge | H04L 27/2676 | 370/203 |
| 2008/0240262 A1* | 10/2008 | Wong | H04L 27/2647 | 375/260 |
| 2008/0298483 A1* | 12/2008 | Marchok | H04L 5/1453 | 375/260 |
| 2009/0004971 A1* | 1/2009 | Dateki | H04L 27/2607 | 455/62 |
| 2009/0046787 A1* | 2/2009 | Uesugi | H04L 25/03891 | 375/260 |
| 2009/0063604 A1* | 3/2009 | Tan | G06F 17/142 | 708/404 |
| 2009/0161804 A1* | 6/2009 | Chrabieh | H04J 11/0066 | 375/346 |
| 2010/0091904 A1* | 4/2010 | Wang | H04B 7/043 | 375/296 |
| 2011/0013487 A1* | 1/2011 | Zhou | G01V 1/18 | 367/131 |
| 2011/0255572 A1* | 10/2011 | Giannakis | H04L 27/2695 | 375/146 |
| 2012/0213312 A1* | 8/2012 | Futatsugi | H04L 25/03828 | 375/296 |
| 2012/0250663 A1* | 10/2012 | Han | H04L 5/0053 | 370/336 |
| 2013/0003901 A1* | 1/2013 | Kato | H04B 17/309 | 375/341 |
| 2013/0114550 A1* | 5/2013 | Hamaguchi | H04W 52/50 | 370/329 |
| 2013/0177092 A1* | 7/2013 | Cariou | H04L 25/0204 | 375/260 |
| 2013/0182802 A1* | 7/2013 | Kato | H04L 25/025 | 375/340 |
| 2013/0272168 A1* | 10/2013 | Humnbadkar | H04B 1/0475 | 370/278 |
| 2014/0112402 A1* | 4/2014 | Marchok | H04L 27/2627 | 375/260 |
| 2014/0169501 A1* | 6/2014 | Nazarathy | H04L 25/03891 | 375/316 |
| 2014/0177741 A1* | 6/2014 | Liu | H04L 27/2627 | 375/260 |
| 2014/0307810 A1* | 10/2014 | Batra | H04L 27/2634 | 375/257 |
| 2015/0163848 A1* | 6/2015 | Lin | H04L 5/0037 | 370/329 |
| 2015/0304146 A1* | 10/2015 | Yang | H04L 27/0008 | 370/329 |
| 2015/0317984 A1* | 11/2015 | Chang | H04S 3/02 | 381/23 |
| 2015/0333944 A1* | 11/2015 | Bae | H04L 23/00 | 375/296 |
| 2015/0372843 A1* | 12/2015 | Bala | H04L 27/2649 | 375/295 |
| 2016/0073364 A1* | 3/2016 | Hamaguchi | H04W 52/38 | 455/522 |

(56) References Cited

U.S. PATENT DOCUMENTS

| | | | | |
|---|---|---|---|---|
| 2016/0269212 | A1* | 9/2016 | Vilaipornsawai | H04L 27/2627 |
| 2017/0033887 | A1* | 2/2017 | Lei | H04W 4/70 |
| 2017/0054586 | A1* | 2/2017 | Lin | H04L 27/2698 |
| 2017/0257238 | A1* | 9/2017 | Qian | H04L 27/2628 |
| 2017/0310509 | A1* | 10/2017 | Qian | H04L 27/2691 |
| 2017/0366383 | A1* | 12/2017 | Demjanenko | H04L 27/2607 |
| 2018/0048510 | A1* | 2/2018 | Nadal | H04L 27/2628 |
| 2018/0183641 | A1* | 6/2018 | Lin | H04L 27/2634 |
| 2019/0068419 | A1* | 2/2019 | Lin | H04L 27/2636 |
| 2019/0081728 | A1* | 3/2019 | Dong | H04L 27/2628 |
| 2019/0330460 | A1* | 10/2019 | Luo | C08L 23/08 |
| 2019/0349230 | A1* | 11/2019 | Atungsiri | H04L 27/2678 |
| 2020/0119825 | A1* | 4/2020 | Lin | H04W 84/22 |
| 2020/0119857 | A1* | 4/2020 | Lin | H04W 72/0413 |

OTHER PUBLICATIONS

English translation of the International Written Opinion dated May 9, 2017 for corresponding International Application No. PCT/FR2017/050560, filed Mar. 13, 2017.

Hao Lin, "Flexible Configured OFDM for 5G Air Interface", IEEE Access, vol. ,. Jan. 1, 2015 (Jan. 1, 2015), pp. 1861-1870, XP055276445.

ZTE, "Discussion on DMRS Enhancement for PC5-based V2V", 3GPP Draft; R1-156660 Discussion on DMRS Enhancement for PCS-Based V2V, 3rd Generation Partnership Project (3GPP), Mobile Competence Centre; 650. Route Des Lucioles ; F-06921 Sophia-Antipolis Cedex, vol. RAN WG1, no. Anaheim, USA; Nov. 15, 2015-Nov. 22, 2015, Nov. 7, 2015 (Nov. 7, 2015), XP051022422.

"The 5G Unified Air Interface", Nov. 30, 2015 (Nov. 30, 2015), XP055269802.

"Fantastic-5G, Novel, flexible air interface for enabling efficient multi-service coexistence for 5G below 6GHz" Frank Schaich with support from the whole consortium, Jan. 28, 2016 (Jan. 28, 2016), XP055321803.

[3GPP] "Motivation for new WI on Low Complexity and Enhanced Coverage LTE UE for MTC", 3GPP TSG RAN Meeting #64 RP-140845, Sophia Antipolis, France, Jun. 10-13, 2014.

* cited by examiner

METHOD AND DEVICE FOR MULTI-SERVICE TRANSMISSION WITH FC-OFDM MODULATION AND CORRESPONDING RECEIVER

CROSS-REFERENCE TO RELATED APPLICATIONS

This Application is a Section 371 National Stage Application of International Application No. PCT/FR2017/050560, filed Mar. 13, 2017, the content of which is incorporated herein by reference in its entirety, and published as WO 2017/153699 on Sep. 14, 2017, not in English.

FIELD OF THE INVENTION

The field of the invention is that of transmissions implementing a multi-carrier modulation generating orthogonal symbols such as an OFDM modulation.

The invention is notably applicable in the field of wireless or wired communications implementing a multi-carrier modulation, for example for LTE/LTE-A cellular communications, for WIFI, WiMAX wireless communications, for PLC, ADSL wired communications, and for DVB-T, DVB-T2, DVB-H, DVB-NGH broadcast.

In particular and without limitation, the invention is applicable in future generation systems (5G, etc.) for which there will be a simultaneous upload transmission of high-data-rate cellular communications, referred to as MBB (acronym for the English term "Mobile Broadband Communications"), and sporadic low-data-rate communications associated with sensors referred to as IoT (acronym for the English term "Internet of Things") or MTC (acronym for the English term "Machine Type Communications") and/or V2X (Vehicular to Vehicular/Infrastructure communications) communications and/or MCC (acronym for the English term "Mission Critical Communications") communications with reference to the terminology used in the working groups associated with the 3GPP and aimed at defining versions beyond the version 13 of the LTE.

PRIOR ART

In the years to come, a densification of the networks of sensors is planned which will have the role of uploading data to an entity for exploitation of these data. The existing networks of video-surveillance cameras may already be mentioned which upload video data. There are other networks in the process of being deployed in very varied fields such as energy with the uploading of data on gas or electricity consumption and such as health with the uploading of physiological data on patients. There is therefore a foreseeable increase in transmissions of information that will transit via the same physical link which will often be a radio link. The sensors are usually considered as static in contrast to cellular communications terminals.

The marketing of connected vehicles is also planned allowing Internet applications grouped under the V2X service terminology to be offered. According to some scenarios envisioned, the communications take place between two vehicles traveling at high speed in opposite directions, or take place between a vehicle and a base station or between a vehicle and a relay for which the relative speed is high. In any case, the quality of service must be guaranteed, the transmission must be reliable, even when the relative speed is high (up to 500 km/h) and the resulting Doppler effect significant.

An IoT service, in other words a service associated with sporadic communications, requires that the IoT device has a very low power consumption so as to ensure a lifetime of the battery that can go up to ten years. Furthermore, the cost of the IoT device must be very low which implies that its hardware complexity must be very reduced. Another important constraint of the IoT service is a signaling cost which must be particularly low given that more than 100,000 devices may be connected inside a single cell.

For the MBB service, in other words the service associated with the high-data-rate cellular communications, the spectral efficiency is very important. Cellular communications are understood to be implemented with wideband mobile transmission systems. The quality of service is another factor that is also very important with respect to the user. On the other hand, the power consumption is a less critical criterion than for the IoT service.

An MCC service is dedicated to uses in an emergency context where the reliability of the information received is vital. This relates for example to disaster situations with the search for buried people or remote medical operations.

The article [IEEE Access] describes, only for a downlink, a method for transmission of data corresponding to an MBB service and to a V2X service modulated with the same frequency-time transform, IFFT, of size M, with a flexible configuration. In a downlink, the base station simultaneously serves several terminals. With each terminal is associated a service which may be different between the terminals. The system FC-OFDM shares the band into sub-bands for simultaneously processing various services by the same IFFT.

Each terminal can transmit independently of another terminal data associated with a service which may equally well be a cellular communication referred to as an MBB service, a communication between communicating objects referred to as an IoT service, a communication between a transmitter and a receiver moving with a high relative speed leading to a strong Doppler effect referred to as a V2X service, a communication dedicated to uses necessitating a very high reliability referred to as an MCC service.

The 3GPP thus defines rules [3GPP] for a base station to be capable of simultaneously receiving communications coming from mobile terminals which require a virtually permanent connectivity with a high, or even very high, data rate (several megabits/s) and sporadic communications coming from sensors. The transmissions generated by sensors have furthermore the particularity of being low rate (a few bits/s, around 20 bytes per day), of random and event-driven nature. MTC communications are based on a transmission chain similar to that specified for MBB communications.

Thus, from the version 8 (release 8), the LTE standard of the 3GPP specifies a single waveform referred to as DFT-s-OFDM for UL (acronym for the English term "uplink") communications. The modulation is a multi-carrier modulation of the OFDM type and each entity transmits during a certain number of time intervals (time slots "in English").

The transmission chain for the DFT-s-OFDM waveform is illustrated by FIG. 1. The chain comprises a pre-coder implementing a discrete Fourier transform (English acronym DFT), a mapper MAP, a frequency-time transformation carried out by means of an IFFT (acronym for the English term "Inverse fast Fourier Transform") over M points and a conditioning with the addition in the time domain of a cyclic prefix CP.

The complex symbols $c_{m,n}$ coming from a binary symbol modulation (QAM constellation) are pre-coded by the pre-coder. The pre-coder is used to obtain a signal whose characteristics in the time domain are similar to those obtained with a modulation with a simple carrier, in other words with a low PAPR (acronym for the English term "Peak-to-Average Power Ratio").

The pre-coded symbols are mapped at the input of the IFFT over the various sub-carriers. The size M of the IFFT determines the number of sub-carriers and the band of the output signal.

The addition of a cyclic prefix CP takes place in the time domain, i.e. after serializing the samples of a DFT-s-OFDM symbol at the output of the IFFT. This addition amounts to inserting at the start of the DFT-s-OFDM symbol a copy of the last samples of this symbol. This cyclic prefix has the function of absorbing the maximum delay associated with the multiple paths or spread of delay of the channel ("delay spread" in English) and to counteract inter-symbol interference linked to time-domain overlapping due to this spread.

According to the standardized mechanism for the LTE, for uplink transmissions, the base station sends synchronization signals to the terminals in such a manner that the frames that they transmit arrive in a synchronous manner with a time reference of the base station. This mechanism is referred to as a closed-loop mechanism in English. The station sends a specific timing value (referred to as "timing advance" in English) to each terminal in order to temporally align the signals from the terminals when received by the base station. This value is determined in such a manner that the residual temporal offset ("time offset" in English) upon the arrival of a received signal does not exceed the extraction window of the cyclic prefix reduced by the delay spread of the channel.

This "timing advance" mechanism, according to the terminology of the LTE standard, has the function of preserving the orthogonality between the transmissions from the various terminals and of each transmission when received by the base station. FIG. 2 shows the structure of a frame generated by the base station which has a duration of 10 ms and is composed of sub-frames of 1 ms duration.

The frames transmitted by the terminals have the same structure. Within each sub-frame, there are 14 DFT-s-OFDM symbols. Each DFT-s-OFDM symbol is preceded by a cyclic prefix CP as illustrated in FIG. 3. When a user/terminal is authorized to transmit data, a certain number of sub-frames are allocated to it, for example, the $1^{st}$ sub-frame.

The "timing advance" mechanism consists in synchronizing the frames received from the terminals onto a time reference of the base station. For the clarity of the description, the illustration considers that it consists in aligning the received frames with a frame of the base station.

Thus, if a user transmits in the $1^{st}$ sub-frame, then the base station determines a time value taking into account the return time A&R between the base station SB and the terminal UE, as illustrated in FIG. 4. Specifically, there is the transmission time of the control signal containing the time value and the transmission time of the data from the terminal.

Despite the fact that the terminal takes this time value into account for synchronizing its transmission, the sub-frame in which its data are located may nevertheless arrive at the base station with a time offset to as illustrated in FIG. 5. This offset ends up within the DFT-s-OFDM symbol as illustrated in FIG. 6 which shows an n-th DFT-s-OFDM symbol denoted DFT-s-OFDM # n. This FIG. 6 illustrates the received positioning of the window for extracting the CP and of the window for extracting the samples on which the FFT is carried out.

Thus, if the offset to is smaller than the duration of the CP, as illustrated in FIG. 6, the orthogonality can be maintained.

Indeed, even if the window for the FFT covers samples included in the CP, the latter being a copy of samples of the DFT-s-OFDM symbol, then the FFT only relates to samples belonging to a single DFT-s-OFDM symbol; there is no loss of information.

If the offset to is larger than the duration of the CP, as illustrated in FIG. 7 which shows the same DFT-s-OFDM symbol denoted DFT-s-OFDM # n, the orthogonality is lost. Indeed, the window for extraction of the samples for the FFT covers samples which are neither in the CP nor in the DFT-s-OFDM symbol itself. These samples generally belong to a preceding DFT-s-OFDM symbol; there is a loss of information due to the loss of orthogonality.

The time value transmitted by the base station may turn out to be too small and the offset may be negative leading to an anti-causal situation, as illustrated in FIG. 8. In this situation, the DFT-s-OFDM symbol arrives in advance as illustrated in FIG. 9 which shows the same DFT-s-OFDM symbol denoted DFT-s-OFDM # n. In this situation, irrespective of the length of the CP, the orthogonality can never be maintained, since there is always a lack of useful samples in the window of the FFT and, furthermore, the latter always covers samples which do not belong to the DFT-s-OFDM symbol.

As illustrated in FIG. 10, the base station BS has to indicate a time value ta1, ta2, ta3 to each terminal UE1, UE2, UE3. This synchronization mechanism is well adapted to the MBB service.

It is, however, not adapted at all for some services such as an IoT service. Indeed, if such a synchronization mechanism is implemented with an IoT service, there is a loss of bandwidth (referred to as "overhead" in English) which is all the more significant and unacceptable the greater the number of communicating objects served by the station. One mechanism envisioned consists in using a course timing ("coarse synchronization" in English) as illustrated in FIG. 11. The synchronization mechanism of the LTE, 1-by-1 TA, leads to a signaling overload as illustrated in the left-hand part of FIG. 11. The coarse synchronization mechanism, 1-to-(TA1, . . . , TAi . . . ) consists in determining a time value for a group of objects. However, this coarse mechanism is not compatible with the LTE standard since it leads to anti-causal negative time offsets to for some objects of a group and causal positive offsets to for other objects of the same group which would result in losses of synchronization and consequently a negative impact on the performance.

There accordingly exists a need for a multi-service transmission technique based on a multi-carrier orthogonal modulation, the services being rendered by synchronous communications or communications with a coarse synchronization, or even without synchronization, which are simultaneously received by a base station.

SUMMARY

The invention provides a method for transmission of data corresponding to a service from amongst several communications services implementing a same frequency-time transform of size M irrespective of the service for managing the orthogonal multi-carrier symbols of M samples starting from data symbols that may be adapted prior to mapping at the input of the transform. During a frame setup, the method adds a cyclic prefix of $L_1$ samples at the start of a multi-carrier symbol or a cyclic suffix of $L_2$ samples at the end of a multi-carrier symbol or it adds a cyclic prefix of $L_1$ samples and a cyclic suffix of $L_2$ samples respectively at the start and at the end of a multi-carrier symbol in order to obtain a sequence of M+L samples. $L=L_1+L_2$. $L_1 \geq 0$, $L_2 \geq 0$.

The method is such that:
it carries out a time-domain filtering according to a function $f(n)$ of the samples n of the sequence, L and M being non-zero natural numbers, L<M:

$$f(n) = \begin{cases} a(n) & n \in [0, L-1] \\ 1 & n \in [L, M-1] \\ b(n) & n \in [M, M+L-1] \end{cases}$$

with $a^2(n) b^2(n M)=1$ for $n \in [0, L-1]$ and with a(n) and b(n) monotonic functions.

Another subject of the invention is a device for transmission of data corresponding to a service from amongst several communications services implementing a multi-carrier modulation with M sub-carriers, such that it comprises:
a frequency-time transformer of size M that is common irrespective of the service generating orthogonal multi-carrier symbols of M samples starting from data symbols that may be adapted prior to mapping at the input of the transformer,
a demultiplexer for serializing the samples of a multi-carrier symbol and carrying out a frame setup while adding a cyclic extension to a multi-carrier symbol, this extension being composed of a cyclic prefix of $L_1$ samples added at the start of a multi-carrier symbol or of a cyclic suffix of $L_2$ samples added at the end of a multi-carrier symbol or of a cyclic prefix of $L_1$ samples and of a cyclic suffix of $L_2$ samples respectively added at the start and at the end of a multi-carrier symbol in order to obtain a sequence of M+L samples, $L=L_1+L_2$, $L_1 \geq 0$ and $L_2 \geq 0$,
a filter according to a function $f(n)$ of the samples n of the sequence, L and M being non-zero natural numbers, $$L < M: f(n) = \begin{cases} a(n) & n \in [0, L-1] \\ 1 & n \in [L, M-1] \\ b(n) & n \in [M, M+L-1] \end{cases}$$

with L<M, $a^2(n)+b^2(n+M)=1$ for $n \in [0, L-1]$ and with a(n) and b(n) monotonic functions.

The device is designed to implement the transmission method according to the invention. In particular, the demultiplexer can thus carry out a frame setup with or without time-domain overlap between successive symbols.

The invention thus determines a new multi-carrier modulation format which, by the addition of a cyclic prefix and/or suffix forming a cyclic extension of L samples to the orthogonal multi-carrier symbols combined with a filtering applying over M+L samples, allows a reception that is more robust to an absence of synchronization. The filter used $f(n)$ has transitions at the two edges which participate in and accentuate the absorption effect of a transmission delay spread, while the absence of weighting over the M samples of the multi-carrier symbol according to the prior art leads to significant secondary lobes and to a spread of the spectrum of the transmitted signal. According to the invention, all the M samples of the symbol are not weighted by a square window as in the prior art. By weighting in a particular manner the prefix, suffix and a part of the samples of the multi-carrier symbol, the invention allows a better spectral efficiency to be achieved by attenuating the secondary lobes (known as "out of band leakage" in English) and by concentrating the spectrum (known as "spectrum confinement" in English) with respect to the prior art while at the same time conserving a robustness to an absence of synchronization. The spectrum concentration furthermore contributes to a maintenance of the mutual orthogonality of the symbols.

Another subject of the invention is a method for receiving data corresponding to a service from amongst several communications services implementing a same time-frequency transform irrespective of the service, such that:
it carries out a time-domain filtering identical to the filtering $f(n)$ used in transmission on a sequence of length M+L samples,
it folds, by adding them, L end samples of the sequence onto L from amongst M central samples of the sequence, it transforms the M central samples of the sequence mapped at the input of the time-frequency transform of size M in order to generate data symbols and
it de-maps the data symbols.

This structure for reception in the time domain has a low complexity and is designed for the processing of the preambles and the channel estimation starting from the receipt of transmitted data according to the invention.

According to one embodiment, the folded samples are the last L samples of the sequence and they are folded by adding them to the first L samples of the sequence. The folding may consist in adding the last L samples of the sequence to the first L samples of the sequence, then in eliminating the last L samples of the sequence. This embodiment is adapted to a transmitted FC-OFDM symbol which only comprises a suffix of L samples.

According to one embodiment, the folded samples are the first L samples of the sequence and they are folded by adding them to the last L samples of the sequence. The folding may consist in adding the first L samples of the sequence to the last L samples of the sequence, then in eliminating the first L samples of the sequence. This embodiment is adapted to a transmitted FC-OFDM symbol which only comprises a prefix of L samples.

According to one embodiment, the $L_1$ and $L_2$ samples of each end of the sequence are folded by respectively adding them to the $L_1$ end samples and to the $L_2$ beginning samples of the M central samples of the sequence. This embodiment is adapted to a transmitted FC-OFDM symbol which comprises a prefix of $L_1$ samples and a suffix of $L_2$ samples.

Another subject of the invention is a method for receiving data corresponding to a service from amongst several communications services implementing a same time-frequency transform irrespective of the service, such that:
it transforms a sequence of M+L received samples completed with zeros mapped at the input of the time-frequency transform of size 2M in order to generate 2M frequency-domain samples,
it carries out a frequency-domain filtering inverse of a time-domain filtering $f(n)$ used in transmission on a sequence of length 2M frequency-domain samples,
it extracts from the filtered frequency-domain sequence the samples of even index in order to obtain a frequency-domain sequence of length M of data symbols,
it de-maps the data symbols.

This structure for reception in the frequency domain is more robust with respect to the propagation delay (delay spread) than the structure in the time domain. It allows a correct detection of the useful signal even in the absence of conventional CP starting from the receipt of transmitted data according to the invention.

Another subject of the invention is a receiver for multi-service telecommunications implementing a multi-carrier modulation comprising:
- a time-domain filter identical to a filter $f(n)$ used in transmission for filtering a sequence of length M+L samples,
- a computer for folding, by adding them, L end samples of the sequence onto L from amongst M samples of the sequence,
- a same time-frequency transform of size M irrespective of the service for generating data symbols starting from the M samples mapped at the input and
- a demultiplexer for de-mapping the data symbols.

Another subject of the invention is a receiver for multi-service telecommunications implementing a multi-carrier modulation comprising:
- a same time-frequency transform of size 2M irrespective of the service for generating 2M frequency-domain samples starting from a sequence of M+L received samples completed with zeros at the input,
- a frequency-domain filter inverse of a time-domain filter $f(n)$ used in transmission for filtering a sequence of length 2M frequency-domain samples,
- a selector for extracting from the filtered frequency-domain sequence the samples of even index and for obtaining a frequency-domain sequence of length M of data symbols,
- a demultiplexer for de-mapping the data symbols.

These receivers are particularly adapted to receiving data transmitted according to the invention.

According to one embodiment of the invention, the cyclic extension comprises a cyclic prefix of $L_1$ samples and a cyclic suffix of $L_2$ samples, $L_1 \neq 0$ and $L_2 \neq 0$. This embodiment allows a symbol to be obtained that is symmetrical or otherwise. When $L_1=0$ or $L_2=0$, then the symbol obtained is always asymmetrical.

The function $f(n)$ may just as easily be non-symmetrical: $f(n) \neq f(M+L-1-n)$ for $n \in [0, L-1]$ as symmetrical: $f(n)=f(M+L-1-n)$ for $n \in [0, L-1]$. A non-symmetrical function is advantageously more robust than a symmetrical function for radio transmissions. On the other hand, when the window $f(n)$ is symmetrical, this means that the number of coefficients of the filter to be stored is divided by two. Thus, if these coefficients are calculated in real time, this embodiment therefore leads to a reduction in complexity.

According to one embodiment of the invention, the transmission complies with a time-frequency frame with preambles multiplexed within the frame according to a configuration depending on the service under the constraint of a maximum number of preambles, the configuration depending on the service being able to allow time-domain multiplexing of the preambles or a time-domain and frequency-domain multiplexing of the preambles to be selected.

The transmission method and the transmission device according to the invention are thus flexible since they are dependent on a configuration associated with the service corresponding to the source data to be transmitted. During an uplink use, in other words from a terminal to a point of access, a base station for example, data are transmitted from the terminals to the point of access. Each terminal may transmit data associated with a service which may just as easily be an MBB service, an IoT service, a V2X service, or a MCC service. Since the services are able to be used successively on the same terminal and simultaneously between various terminals, the transmitter of the terminal must be able to transmit them and the receiver of the base station must be able to receive them simultaneously. Only a time-domain interleaving of the preambles every 0.5 ms is specified in the LTE standard release 12 uplink.

According to this embodiment, the transmitted frame always comprises a time-domain multiplexing of the preambles whose regularity is typically traced onto the frame of the LTE standard which therefore allows the compatibility with this standard to be guaranteed.

The cases of use for the V2X service take into account speeds that can go up to 500 km/h and a band of 2 GHz. In such conditions, the coherence time of the channel is 0.4 ms and, as a consequence, a preamble every 0.5 ms does not allow the channel to be correctly estimated and its variations over time to be followed.

According to this embodiment, by combining a multiplexing of the preambles in the two axes, it becomes possible to determine a structure of the preambles in the time-frequency plane allowing an estimation of the compatible channel to be obtained from the coherence time. The constraint of the maximum number of multiplexed preambles allows the same data rate to be conserved (no increase in the associated band loss (overhead)). Such a structure is particularly adapted for a V2X service since it allows the structure to be adapted to the coherence time of the channel without increasing the band loss.

According to one embodiment, the invention adapts the data prior to mapping at the input of the frequency-time transform according to a configuration depending on the service for generating data symbols used for the mapping, the configuration depending on the service being able to allow no, one or several processing operations to be selected from amongst a padding, a discrete Fourier transform of size N, a spread.

For an MBB service, the configuration typically allows the discrete Fourier transform of size N and the time-domain multiplexing of the preambles to be selected. For a V2X service, the configuration typically allows the discrete Fourier transform of size N and the time-domain and frequency-domain multiplexing of the preambles to be selected. For a MCC service, the configuration typically allows the discrete Fourier transform of size N, the spread and the time-domain multiplexing of the preambles to be selected. For an IoT service, the configuration typically allows the padding, the discrete Fourier transform of size N and the time-domain multiplexing of the preambles to be selected.

According to one embodiment, the spread has a spread factor P and each spread data value is multiplied by a weighting $w_p$, $p=1, \ldots, P$.

The spread allows the diversity of each transmitted data value to be increased. This embodiment is particularly adapted to an MCC service which necessitates a very large reliability of transmission.

According to one embodiment, $$a(n) = \cos\left(\frac{\pi}{L}(L-1-n)\right) \text{ and } b(n) = \sin\left(\frac{\pi}{L}(M+L-1-n)\right).$$

According to this embodiment, the function $f(n)$ obtained is symmetrical.

According to one embodiment, $$a(n) = \cos\left(\frac{\pi}{2L^2}(L-1-n)^2\right) \text{ and } b(n) = \sin\left(\frac{\pi}{2L^2}(M+L-1-n)^2\right).$$

According to this embodiment, the function (window) $f(n)$ is not symmetrical which results in a greater robustness against the delay spread.

According to one embodiment, $$b(n) = e^{-\left(\alpha\left(\frac{n-M}{L}\right)^\beta\right)}$$

and $a(n)=\sqrt{1-b^2(n+M)}$ for $n \in [0,L-1]$, $\alpha$ and $\beta$ being parameters having a real value strictly greater than zero. This embodiment allows either a symmetrical function $f(n)$ or a non-symmetrical function $f(n)$ to be obtained depending on the value of the parameters $\alpha$ and $\beta$.

According to one embodiment, during the frame setup, two successive symbols overlap in time by a value D, D being an integer greater than or equal to zero. This embodiment allows the impact on the data rate of the addition of a cyclic extension to be reduced.

According to one embodiment, the invention comprises the transmission of a signaling message coding the configuration.

LIST OF THE FIGURES

Other features and advantages of the invention will become apparent during the description that follows presented with regard to the appended figures given by way of non-limiting example.

FIG. 8 is a diagram identical to that in FIG. 5 with a negative offset to.

FIG. 9 is a diagram identical to that in FIG. 6 with a negative offset to.

DESCRIPTION OF EMBODIMENTS OF THE INVENTION

Figure 12:
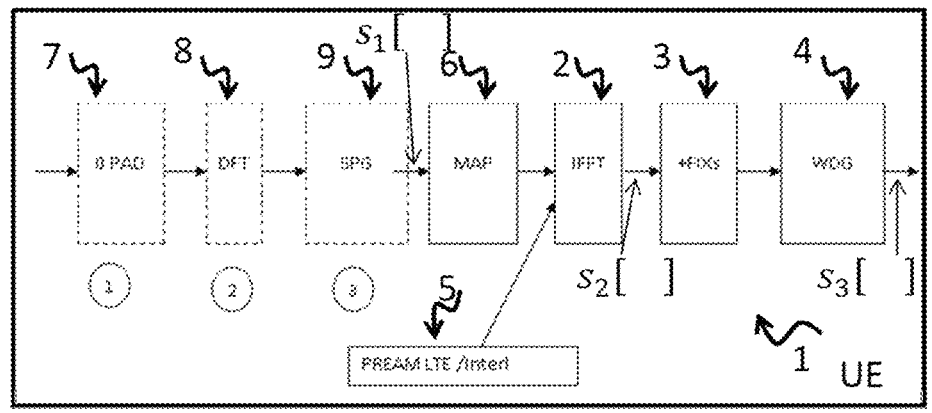
FIG. 12 is a diagram of the transmission technique according to the invention implemented by a terminal.

The transmission technique according to the invention is illustrated in FIG. 12. The transmission method 1 according to the invention implemented by a terminal UE generates a new multi-carrier modulation format configurable according to the service with the implementation of the same frequency-time transform of size M and with the same processing after IFFT irrespective of the service which allow the simultaneous processing at the data reception associated with various services. This scheme is called FC-OFDM.

The new modulation format is obtained with the addition 3 (+FIXs) of a cyclic prefix and/or suffix to the orthogonal multi-carrier symbols generated 2 by the frequency-time transform IFFT combined with a filtering 4 by a filter WDG applied over M+L samples. L and M are non-zero natural numbers. Denoting $s_1[\ ]$ the sequence to be mapped at the input of IFFT, $s_2[\ ]$ the sequence prior to addition of a cyclic prefix and/or suffix and $s_3[\ ]$ the sequence after the filtering WDG of function $f$, then the following may be written:

$s_2[m]$ for $m \in [0,M-1]$ $s_3[n]=s_2[\text{mod}(n-U,M)] \times f[n]$ for $n \in [0, M L-1]$ and $U=L_1$.

According to this expression, the sequence obtained $s_3[n]$ may either comprise a prefix of $L_1$ samples, or a suffix of $L_2$ samples, or a prefix and a suffix respectively of $L_1$ and of $L_2$ samples.

Figure 13:
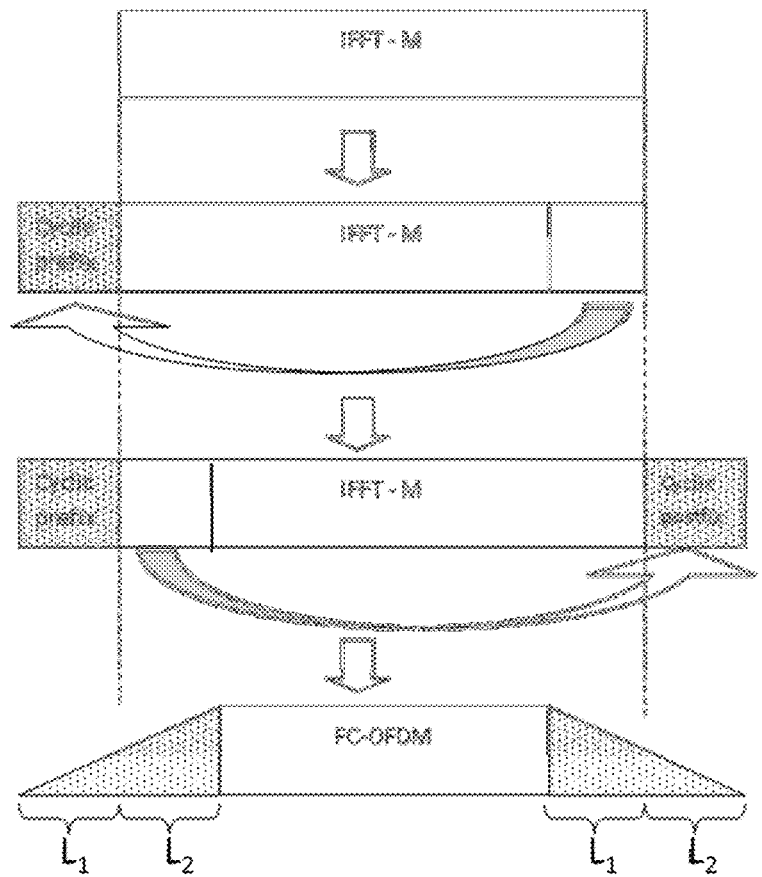
FIG. 13 is a diagram illustrating the addition of a cyclic prefix and suffix onto a symbol at the IFFT output, together with the effect of the filtering according to one embodiment.

FIG. 13 illustrates the addition, according to one embodiment, of a cyclic prefix and suffix to an orthogonal multi-carrier symbol, together with the filtering according to the invention. The method copies the last $L_1$ samples of a multi-carrier symbol supplied by the IFFT of size M at the start of this symbol thus creating a cyclic prefix. The method furthermore copies the first $L_2$ samples of the same multi-carrier symbol at the end of this symbol thus creating a cyclic suffix. The symbol then comprises M+L samples, with $L=L_1+L_2$. The filtering is applied over the M+L samples, which amounts to filtering the samples n of the sequence with a function $f(n)$:

$$f(n) = \begin{cases} a(n) & n \in [0, L-1] \\ 1 & n \in [L, M-1] \\ b(n) & n \in [M, M+L-1] \end{cases}$$

with $a^2(n)+b^2(n+M)=1$ for $n \in [0, L-1]$ and with $a(n)$ and $b(n)$ monotonic functions. Hence, $a(n)=\sqrt{1-b^2(n+M)}$ for $n \in [0, L-1]$.

According to one embodiment, $$a(n) = \cos\left(\frac{\pi}{2L}(L-1-n)\right) \text{ and } b(n) = \sin\left(\frac{\pi}{2L}(M+L-1-n)\right).$$

According to one embodiment, $$a(n) = \cos\left(\frac{\pi}{2L^2}(L-1-n)^2\right) \text{ and } b(n) = \sin\left(\frac{\pi}{2L^2}(M+L-1-n)^2\right).$$

According to one embodiment, $$b(n) = e^{-\left\{\alpha\left(\frac{n-M}{L}\right)^\beta\right\}}$$

and $a(n)=\sqrt{1-b^2(n+M)}$, $n \in [0, L-1]$, $\alpha$ and $\beta$ are parameters having a real value strictly greater than zero. Typically, their value is adjusted during simulations.

Figure 1:
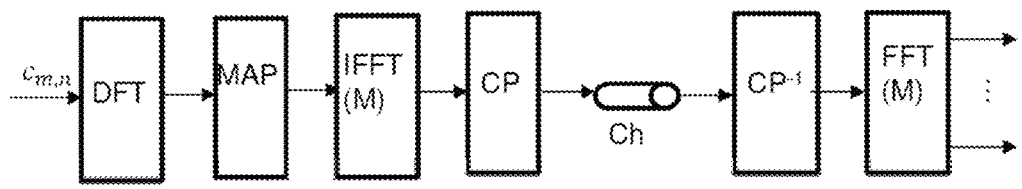
FIG. 1 is a diagram of the transmission chain of the waveform DFT-s-OFDM according to the prior art.
Figure 2:
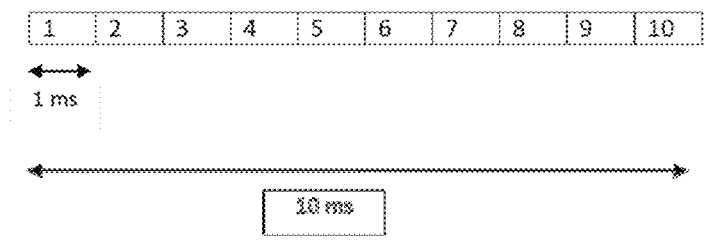
FIG. 2 is a diagram of the structure of a frame generated by the base station which has a duration of 10 ms and is composed of sub-frames of duration 1 ms according to the LTE standard.
Figure 3:
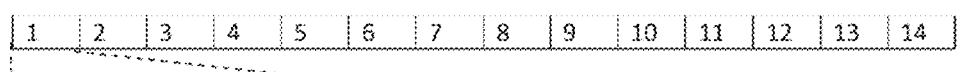
FIG. 3 is a diagram of a sub-frame which comprises 14 DFT-s-OFDM symbols, each DFT-s-OFDM symbol being preceded by a cyclic prefix CP according to the LTE standard.
Figure 4:
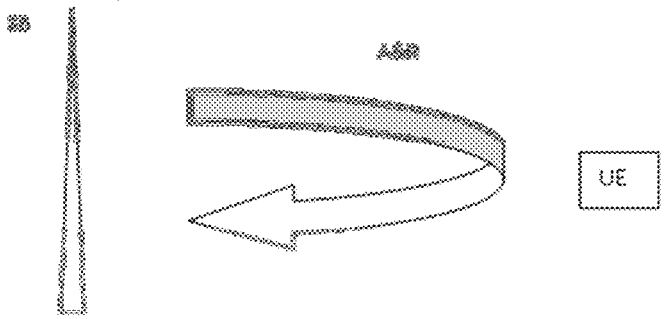
FIG. 4 is a diagram illustrating the uplink synchronization mechanism of the LTE standard showing the return time A&R between the base station SB and the terminal UE.
Figure 5:
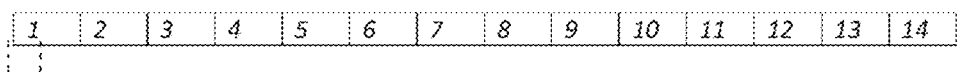
FIG. 5 is a diagram showing a time offset to between the reference frame (base station) for the synchronization and the received frame.
Figure 6:
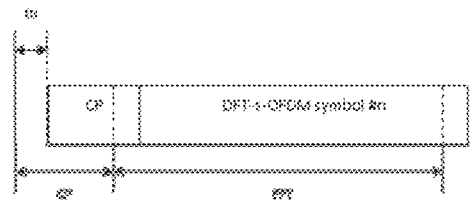
FIG. 6 is a diagram showing the time offset to in the DFT-s-OFDM symbol, together with the positioning of the window for extraction of the CP and of the window for the FFT with respect to the DFT-s-OFDM symbol.
Figure 7:
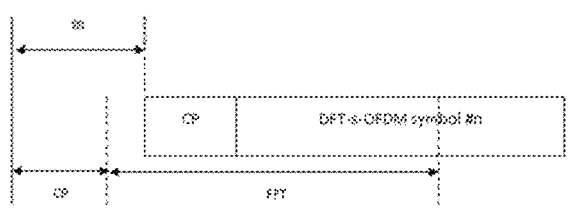
FIG. 7 is a diagram identical to that in FIG. 6 with an offset to greater than the window for extraction of the CP.
Figure 8:
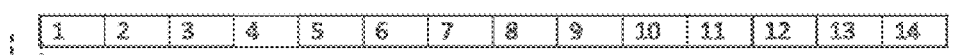
Figure 8:
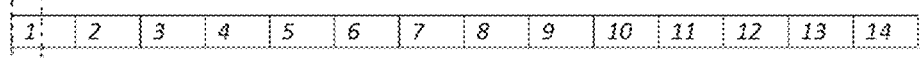
Figure 9:
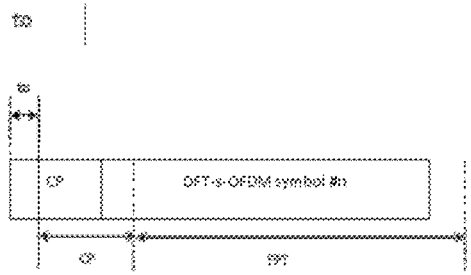
Figure 10:
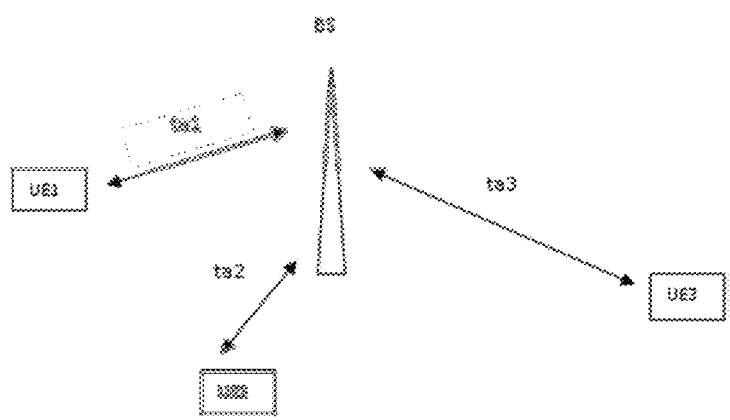
FIG. 10 is a diagram illustrating the synchronization mechanism between the base station and each terminal UE1, UE2, UE3 with the sending of a signal containing the time value ta1, ta2, ta3.
Figure 11:
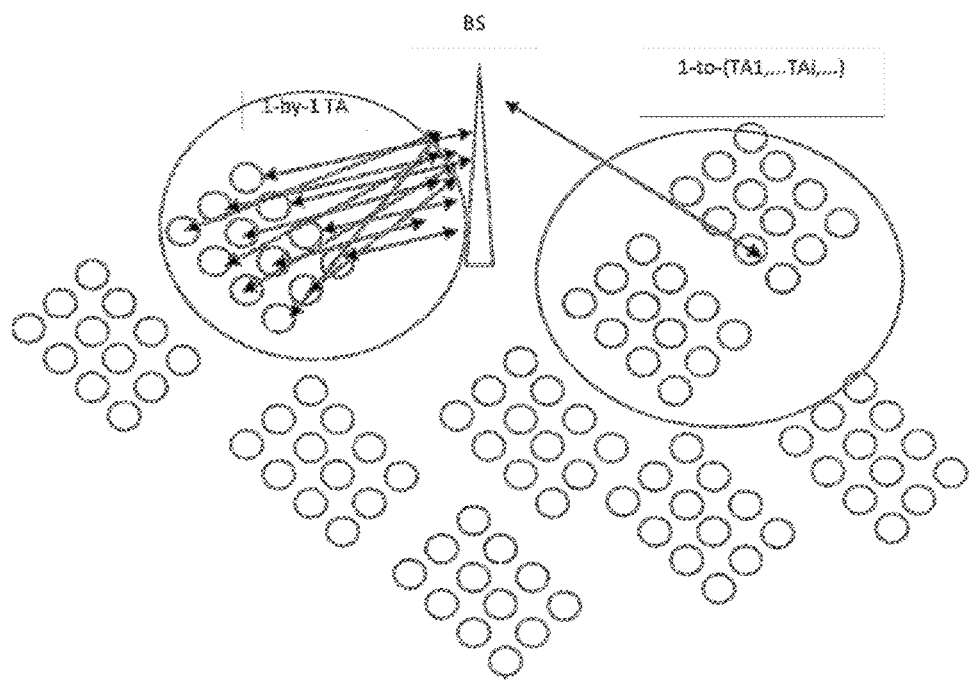
FIG. 11 is a diagram illustrating a coarse synchronization mechanism for an IoT service.
Figure 14:
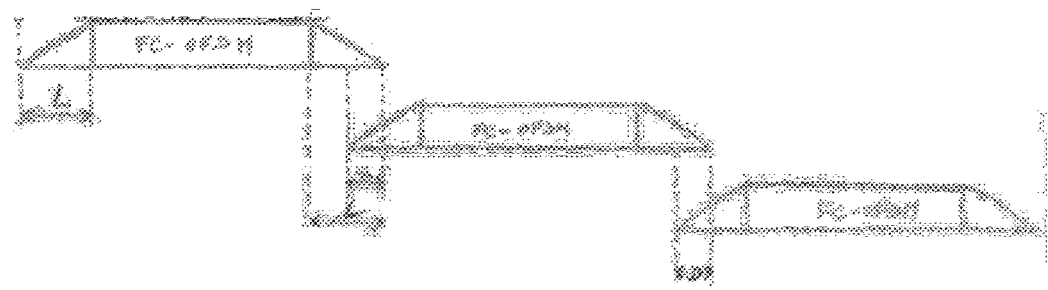
FIG. 14 is a diagram illustrating a frame setup with time-domain overlap between successive symbols.

FIG. 14 illustrates the frame setup for three successive symbols with a time-domain overlap D between two successive symbols. D is an integer greater than or equal to zero whose value is typically determined during simulations. D is a parameter which corresponds to a number of samples of a FC-OFDM symbol onto which other samples of the next FC-OFDM symbol are superposed.

Figure 15:
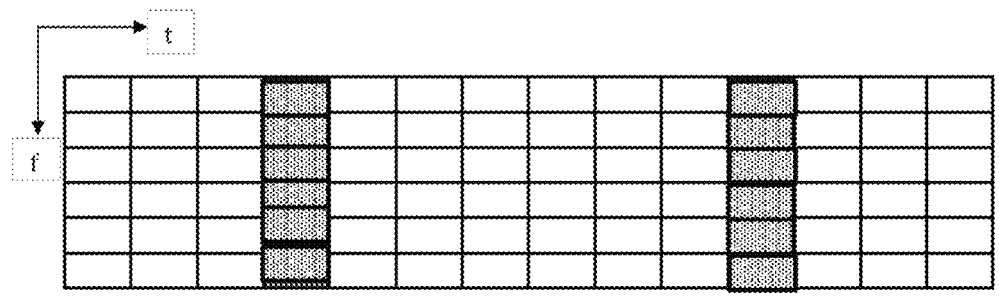
FIG. 15 shows a sub-frame of 1 ms according to the LTE standard in which the preambles are multiplexed at the $4^{th}$ and the $11^{th}$ position.
Figure 16:
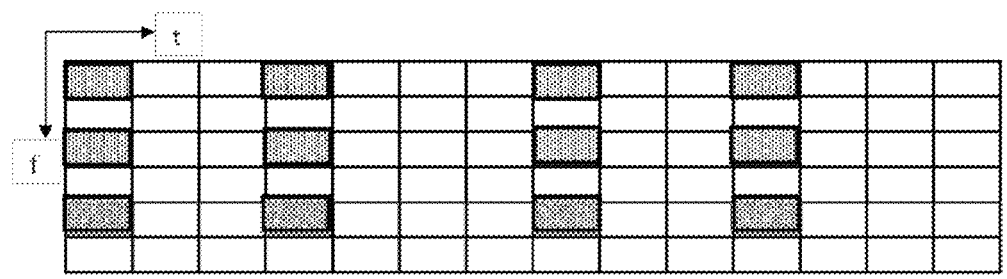
FIG. 16 illustrates the simultaneous time-domain and frequency-domain multiplexing of the preambles according to the invention.

The transmission complies with a time-frequency frame with preambles multiplexed within the frame. According to one embodiment, the multiplexing is configurable, depends on the service and is under the constraint of a maximum number of preambles. Depending on the service, the configuration allows, with reference to FIG. 12, a time-domain multiplexing of the preambles or a time-domain and frequency-domain multiplexing of the preambles to be selected 5. In an uplink (UL) frame according to the LTE standard, the preambles are always transmitted at a fixed position with an interval of 0.5 ms. FIG. 15 shows a sub-frame of 1 ms complying with the LTE standard in which the preambles are multiplexed at the 4$^{th}$ and the 11$^{th}$ position. The preambles are therefore only multiplexed in time. According to the invention, the multiplexing may be carried out simultaneously in time and in frequency as illustrated in FIG. 16. According to the example illustrated, the time interval between the preambles is reduced which increases the robustness with respect to the Doppler effect and allows a time-domain estimation of the channel compatible for example with a V2X service. In contrast, the preambles are multiplexed in frequency which allows the same band consumed (overhead) by the preambles to be conserved.

The method according to the invention is flexible with an adaptation of the data before frequency-time transformation according to a configuration depending on the service in order to generate data symbols.

The configuration depending on the service allows, with reference to FIG. 12, no, one or several processing operations to be selected from amongst a padding 7, 0 PAD, a discrete Fourier transform 8, DFT, of size N, a spread 9, SPG.

The padding consists in adding zeros ("zero padding" in English) in order to adjust the number of data at the input.

Figure 17:
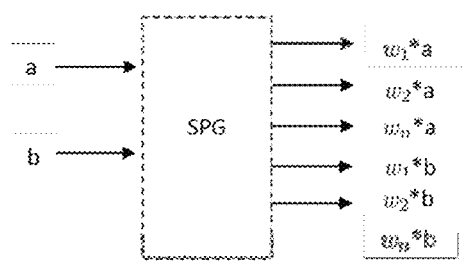
FIG. 17 is one example of a spread.

The spread allows the diversity of the data to be increased. One example of a spread is illustrated by FIG. 17. According to this example, the data values at the input are taken in pairs, a and b, and each one is weighted with P weightings, $w_p$, p=1, ..., P, in order to generate two times P spread data: $aw_1, \ldots, aw_p, bw_1, \ldots, bw_p$. The spread factor P is strictly greater than one. The weightings may have a constant value: $|w_1|=|w_2|=\ldots=|w_P|$ or a non-constant value and a constant sign or a non-constant sign.

Figure 18:
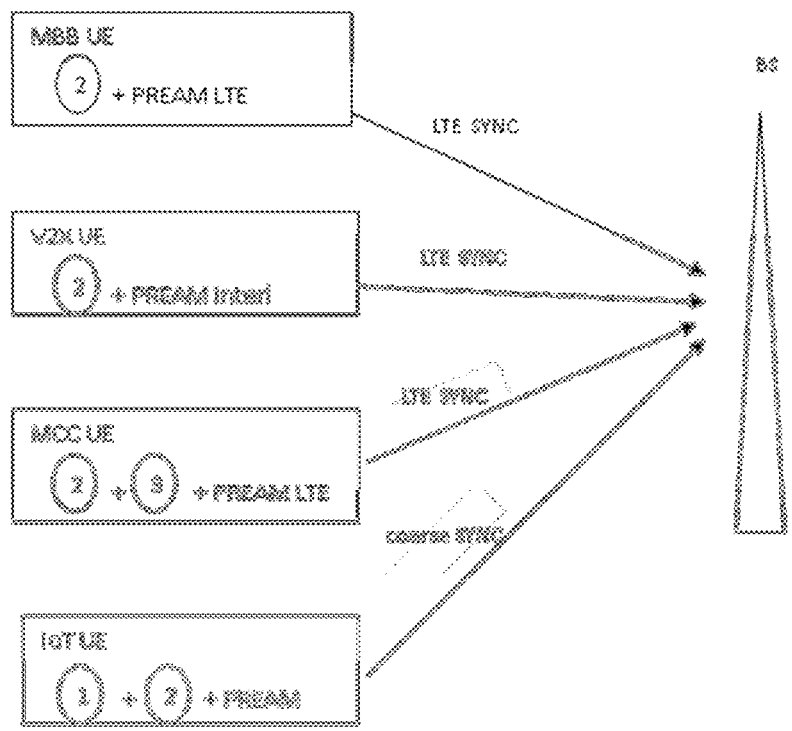
FIG. 18 is a diagram of one example of implementation of a transmission method according to the invention.

FIG. 18 illustrates one example of implementation of a method of transmission according to the invention. Four terminals UE transmit data associated with different services. The base station BS simultaneously receives (FDMA access) the data coming from the four terminals. The 1$^{st}$ terminal transmits data associated with an MBB service. The 2$^{nd}$ terminal transmits data associated with a V2X service. The 3$^{rd}$ terminal transmits data associated with a MCC service. The 1$^{st}$, 2$^{nd}$ and 3$^{rd}$ terminals benefit from a synchronization mechanism (LTE SYNC) with respect to the base station BS. The 4$^{th}$ terminal transmits data associated with an IoT service and does not benefit from a synchronization mechanism or benefits from a coarse synchronization mechanism (coarse SYNC) with respect to the base station BS. Each terminal has its own configuration that it transmits to the base station. The 1$^{st}$ terminal is configured with activation of the DFT (p2, FIG. 12) and of the time-domain multiplexing of the preambles (PREAM LTE). The 2$^{nd}$ terminal is configured with activation of the DFT (p2, FIG. 12) and of the time-domain and frequency-domain multiplexing of the preambles (PREAM Interl). The 3$^{rd}$ terminal is configured with activation of the DFT (p2, FIG. 12), of the spread (p3, FIG. 12) and of the time-domain multiplexing of the preambles (PREAM LTE). The 4$^{th}$ terminal is configured with activation of the padding, of the DFT (p2, FIG. 12) and of the time-domain multiplexing of the preambles (PREAM LTE).

Figure 19:
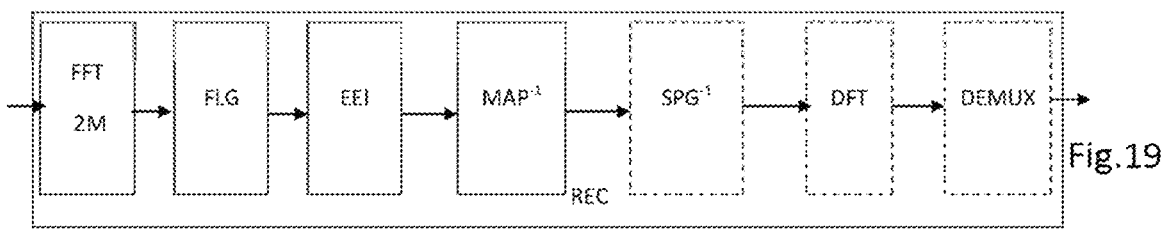
FIGS. 19 and 20 are diagrams respectively illustrating two embodiments of the reception according to the invention.
Figure 20:
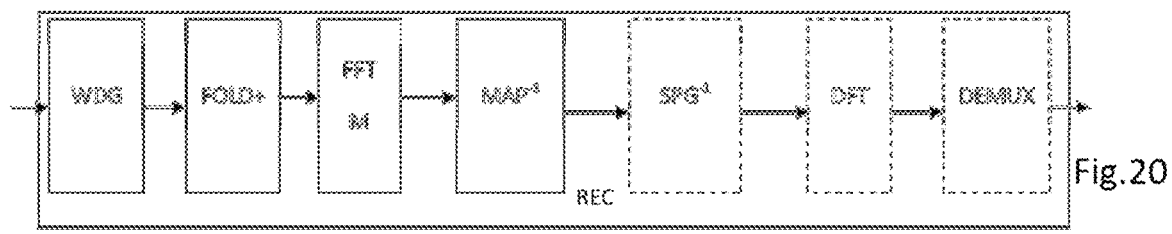

The reception at the base station is illustrated in FIGS. 19 and 20 which respectively correspond to two embodiments. Irrespective of the service, the reception implements the same time-frequency transform FFT.

Figure 21:
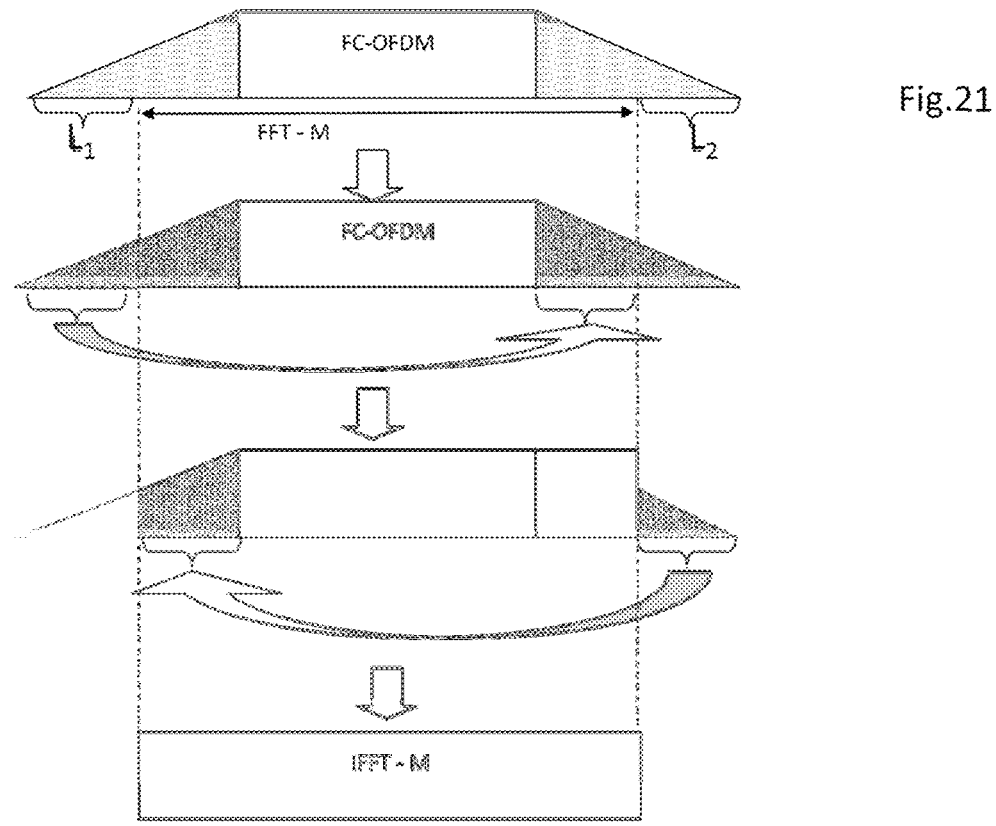
FIG. 21 is a diagram of one embodiment of the folding involved in the embodiment in FIG. 19.

According to the 1$^{st}$ embodiment, FIG. 19, the received FC-OFDM symbols of length M+L samples are filtered by the filter WDG, then undergo a folding implemented by a computer FOLD+ prior to the FFT of size M. The filter WDG is the same as that used in transmission, and implements the function $f(n)$. The folding according to one embodiment is illustrated in FIG. 21. The first $L_1$ samples of the filtered FC-OFDM symbol are added to the samples that precede the last $L_2$ samples of this symbol and the first $L_1$ samples of the filtered FC-OFDM symbol are eliminated. The last $L_2$ samples of the filtered FC-OFDM symbol are added to the samples that follow the first $L_1$ samples of the filtered FC-OFDM symbol and the last $L_2$ samples of the filtered FC-OFDM symbol are eliminated. This embodiment is adapted to the transmission of a FC-OFDM symbol with a cyclic prefix and suffix of $L_1$ and $L_2$ samples, respectively.

The FFT is applied over the M samples obtained after additions which, according to the embodiment illustrated in FIG. 21, correspond to the M central samples, i.e. according to the example $L_1=L_2$. The samples at the FFT output are de-mapped by a de-mapper MAP then the processing that follows depends on the configuration used in the transmission by the terminal.

According to the 2$^{nd}$ embodiment, FIG. 20, the received symbols FC-OFDM of length M+L are padded with zeros in order to obtain a sequence of length 2M. This sequence is transformed in the frequency domain with a FFT of size 2M. The frequency-domain samples are filtered with a filter FLG of function F(m) such that:

$$F(m) = \sum_{n=0}^{2M-1} f(n) e^{-\frac{j2\pi mn}{2M}}.$$

After filtering, only the samples of even index are conserved at the output of the selector EEI. The samples at the output of the selector are de-mapped by a de-mapper MAP then the processing that follows depends on the configuration used in the transmission by the terminal.

[IEEE Access] Hao LIN, "Flexible Configured OFDM for 5G Air Interface", IEEE ACCESS, 1 Jan. 2015, XP055276445

[3GPP] "Motivation for new WI on Low Complexity and Enhanced Coverage LTE UE for MTC", 3GPP TSG RAN Meeting #64 RP-140845, Sophia Antipolis, France, 10-13 Jun. 2014

Although the present disclosure has been described with reference to one or more examples, workers skilled in the art will recognize that changes may be made in form and detail without departing from the scope of the disclosure and/or the appended claims.

The invention claimed is:

1. A method comprising:
   transmitting data corresponding to a service from amongst several communications services implementing a same frequency-time transform (IFFT) of size M irrespective of the service in order to generate orthogonal multi-carrier symbols of M samples starting from data symbols including:
   during a frame setup, adding a cyclic extension of $L=L_1+L_2$ samples in order to obtain a sequence of $M+L$ samples, and
   setting up the frame according to a configuration depending on the service, which allows a selection between no, one or several processing operations from amongst a padding, a discrete Fourier transform of size N and a spread for adapting the data prior to mapping at an input of the frequency-time transform, and
   the method comprises time-domain filtering according to a function $f(n)$ of the samples n of the sequence, L and M being non-zero natural numbers, L<M:

$$f(n) = \begin{cases} a(n) & n \in [0, L-1] \\ 1 & n \in [L, M-1] \\ b(n) & n \in [M, M+L-1] \end{cases}$$

with a(n) and b(n) monotonic functions and with $a^2(n)+b^2(n+M)=1$ for $n \in [0, L-1]$, $L_1 \geq 0$ and $L_2 \geq 0$.

2. The method as claimed in claim 1, in which the function $f(n)$ is non-symmetrical: $f(n) \neq f(M+L-1-n)$ for $n \in [0, L-1]$.

3. The method as claimed in claim 1, in which the cyclic extension comprises a cyclic prefix of $L_1$ samples and a cyclic suffix of $L_2$ samples, $L_1 \neq 0$ and $L_2 \neq 0$.

4. The method as claimed in claim 1, in which the transmitting complies with a time-frequency frame with preambles multiplexed within the frame according to a configuration depending on the service under a constraint of a maximum number of preambles, the configuration depending on the service being able to allow a time-domain multiplexing of the preambles or a time-domain and frequency-domain multiplexing of the preambles to be selected.

5. The method as claimed in claim 1 in which the spread has a spread factor P and each spread data value is multiplied by a weighting $w_p$, $p=1, \ldots, P$.

6. The method as claimed in claim 1 in which $$a(n) = \cos\left(\frac{\pi}{2L}(L-1-n)\right) \text{ and } b(n) = \sin\left(\frac{\pi}{2L}(M+L-1-n)\right).$$

7. The method as claimed in claim 1 in which $$a(n) = \cos\left(\frac{\pi}{2L^2}(L-1-n)^2\right) \text{ and } b(n) = \sin\left(\frac{\pi}{2L^2}(M+L-1-n)^2\right).$$

8. The method as claimed in claim 1 in which $$b(n) = e^{-\left(\alpha\left(\frac{n-M}{L}\right)^\beta\right)}$$

and $a(n) = \sqrt{1-b^2(n+M)}$ for $n \in [0, L-1]$, $\alpha$ and $\beta$ being parameters having a real value strictly greater than zero.

9. The method as claimed in claim 1 in which, during the frame setup, two successive symbols overlap in time by a value D, D being an integer greater than or equal to zero.

10. The method as claimed in claim 1, comprising transmission of a signaling message coding the configuration.

* * * * *